US011304119B2

(12) United States Patent
Burlacu et al.

(10) Patent No.: US 11,304,119 B2
(45) Date of Patent: Apr. 12, 2022

(54) METHOD FOR COOPERATIVE USE OF A WIRELESS COMMUNICATION INTERFACE AND A WIRELESS CHARGING INTERFACE

(71) Applicant: Continental Automotive GmbH, Hannover (DE)

(72) Inventors: Bogdan Alexandru Burlacu, Timisoara (RO); Sebastian Ille, Giroc (RO); Cristian Saracin, Timisoara (RO); Horatiu Cristian Eppel, Resita (RO); Serban Craciun, Timisoara (RO)

(73) Assignee: Continental Automotive GmbH

( * ) Notice: Subject to any disclaimer, the term of this patent is extended or adjusted under 35 U.S.C. 154(b) by 16 days.

(21) Appl. No.: 16/695,846

(22) Filed: Nov. 26, 2019

(65) Prior Publication Data

US 2020/0205057 A1 Jun. 25, 2020

(30) Foreign Application Priority Data

Dec. 19, 2018 (EP) ..................................... 18465644

(51) Int. Cl.
*H04W 48/08* (2009.01)
*H04W 48/20* (2009.01)
*H04W 52/02* (2009.01)
*H04B 5/00* (2006.01)

(52) U.S. Cl.
CPC .......... *H04W 48/08* (2013.01); *H04B 5/0037* (2013.01); *H04W 48/20* (2013.01); *H04W 52/0229* (2013.01)

(58) Field of Classification Search
CPC . H04W 48/08; H04W 48/20; H04W 52/0229; H04B 5/0037; H04B 5/0031; H04B 5/0056; H02J 50/80; H02J 50/40
See application file for complete search history.

(56) References Cited

U.S. PATENT DOCUMENTS

| 9,281,706 | B2 * | 3/2016 | McFarthing | ............ H02J 7/007 |
| 9,497,586 | B2 * | 11/2016 | Akizuki | ................ H04W 76/20 |
| 2010/0150276 | A1 * | 6/2010 | Yew | ........................ H04H 60/64 375/340 |

(Continued)

FOREIGN PATENT DOCUMENTS

WO 2010093964 A2 8/2010

OTHER PUBLICATIONS

Extended European Search Report for European Application No. 18465644.5, dated Jun. 26, 2019, 8 pages.

*Primary Examiner* — Dominic E Rego
(74) *Attorney, Agent, or Firm* — RatnerPrestia

(57) ABSTRACT

A method for cooperative use of a wireless communication interface and a wireless charging interface, wherein the wireless charging interface supports a first searching mode and a second searching mode. The method includes: searching, by a wireless docking station, for a wireless communication device that supports the wireless communication interface; if any wireless communication device that supports the wireless communication interface has been found, searching, by the wireless docking station, for a wireless charging device according to the first searching mode; and if no wireless communication device that supports the wireless communication interface has been found, searching, by the wireless docking station, for a wireless charging device according to the second searching mode.

16 Claims, 2 Drawing Sheets

(56) References Cited

U.S. PATENT DOCUMENTS

| | | | | |
|---|---|---|---|---|
| 2010/0207572 | A1* | 8/2010 | Kirby | H02J 50/12 |
| | | | | 320/101 |
| 2011/0231406 | A1* | 9/2011 | Ochs | H04L 29/12292 |
| | | | | 707/748 |
| 2012/0182965 | A1* | 7/2012 | Das | H04W 48/14 |
| | | | | 370/331 |
| 2015/0285926 | A1* | 10/2015 | Oettinger | H02J 50/70 |
| | | | | 307/104 |
| 2016/0322853 | A1* | 11/2016 | Porat | H02J 50/12 |
| 2016/0336807 | A1* | 11/2016 | Mach | H02J 5/005 |
| 2017/0040817 | A1* | 2/2017 | Hu | H02J 7/007182 |
| 2017/0061142 | A1* | 3/2017 | Niessen | G06F 1/26 |
| 2017/0117741 | A1* | 4/2017 | Lee | H02J 50/80 |
| 2018/0131413 | A1* | 5/2018 | Won | H02J 50/90 |
| 2018/0241223 | A1* | 8/2018 | Bae | H02J 7/025 |

* cited by examiner

METHOD FOR COOPERATIVE USE OF A WIRELESS COMMUNICATION INTERFACE AND A WIRELESS CHARGING INTERFACE

CROSS REFERENCE TO RELATED APPLICATIONS

This application claims priority to European Patent Application No. EP18465644, filed Dec. 19, 2018, the contents of such application being incorporated by reference herein.

FIELD OF THE INVENTION

An aspect of the invention relates to a method for cooperative use of a wireless communication interface and a wireless charging interface, particularly in a vehicle. Furthermore, an aspect of the invention relates to an apparatus, a vehicle, a program element, and a computer-readable medium.

BACKGROUND OF THE INVENTION

In at least some vehicles, there is a requirement to support wireless charging of electric devices such as smartphones, tablets, or other kind of electric devices. Wireless charging may be performed by using a protocol by the Wireless Power Consortium (WPC). However, at least some of these electric devices also support wireless communication interfaces. Some devices, which support at least some of these wireless communication interfaces, may be sensitive to the energy provided by the wireless charging. Examples may be devices that support the so-called Near Field Communication (NFC) interface and/or other wireless communication protocols. In at least some cases, these devices or parts of them, which are configured to support wireless communication protocols, may even have a higher risk to be damaged by wireless charging.

SUMMARY OF THE INVENTION

An aspect of the invention is a method for improving these drawbacks at least partly.

A first aspect of the invention relates to a method for cooperative use of a wireless communication interface and a wireless charging interface, wherein the wireless charging interface supports a first searching mode and a second searching mode. The method comprises the steps of:

Searching, by a wireless docking station, for a wireless communication device that supports the wireless communication interface;

If any wireless communication device that supports the wireless communication interface has been found, searching, by the wireless docking station, for a wireless charging device according to the first searching mode; and If no wireless communication device that supports the wireless communication interface has been found, searching, by the wireless docking station, for a wireless charging device according to the second searching mode.

The wireless communication interface may comprise an interface that supports wireless data communication protocols and/or other wireless communication protocols, such as speech and/or signal communication protocols. The wireless communication interface may comprise protocols like Wireless LAN (e.g. WLAN according to 802.11a/b/g/n or 802.11p), ZigBee, WiMax, Ultra-Wide Band (UWB), Bluetooth, Near Field Communication (NFC), GSM, UMTS, LTE, or others.

The wireless charging interface may support a protocol by the Wireless Power Consortium (WPC). The wireless charging interface supports a first searching mode and a second searching mode. The first and the second searching mode is configured to find and/or detect an electric device that supports a charging protocol and/or the wireless charging interface. The first and the second searching mode may support the same searching protocol or a different searching protocol. The first searching mode is a low-power searching mode, i.e. the electric power used for searching, finding and/or detecting an electric device that supports the charging protocol is so low that there is only a low risk—at least for some devices a very low risk or even no risk—that the device's circuits and/or subsystems are damaged by the electric power used for the first searching mode, particularly the device's communication protocol circuits and/or communication protocol subsystems. The second searching mode may use a higher power or the same power than the first searching mode.

The cooperative use of a wireless communication interface and a wireless charging interface comprises the support of at least one wireless communication protocol and at least one wireless charging protocol.

The method comprises to search for a wireless communication device that supports the wireless communication interface. The searching for a wireless communication device depends on the wireless communication interface and/or its protocol suite. The searching is initiated and/or performed by the wireless docking station. The searching for a wireless communication device may comprise the searching for more than one wireless communication protocol. This may include to search for wireless communication devices whose protocols are not supported—at least not actively supported—by the wireless docking station.

The wireless docking station may be placed at a desk, a table, and/or in a vehicle. For cars, trucks, ships or other vehicles it may be advantageous to place the wireless docking station close to the driver and/or some passenger. In some embodiments, the searching for the wireless communication device is the first step of the method. In some embodiments, the searching comprises a polling, i.e. the searching is performed in an iterative way.

If any wireless communication device that supports the wireless communication interface has been found, the wireless docking station searches for a wireless charging device according to the first searching mode. This is advantageous, because the first searching mode is configured to use electric power that is so low, that there is only a low risk (or no risk) to damage the device's circuits and/or subsystems.

If no wireless communication device that supports the wireless communication interface has been found, the wireless docking station searches for a wireless charging device according to the second searching mode. This is advantageous, because the searching performance may be improved by using the second searching mode.

In an embodiment, the first searching mode supports searching with limited power, and the second searching mode supports searching with normal power. This embodiment has the advantage of, on the one hand, providing protection against high-power emission when necessary, and, on the other hand, enables high-power searching when possible without damaging devices.

In an embodiment, the method comprises the further steps of:

If any wireless charging device that supports the wireless charging interface and any wireless communication device that supports the wireless communication interface has been found, charging, by the wireless docking station, according to a first charging mode; and If any wireless charging device that supports the wireless charging interface and no wireless communication device that supports the wireless communication interface has been found, charging, by the wireless docking station, according to a second charging mode.

The first charging mode is a low-power charging mode, i.e. the electric power used for charging the electric device that supports the charging protocol is so low that there is only a low risk—at least for some devices a very low risk or even no risk—that the device's circuits and/or subsystems are damaged by the electric power used for the first charging mode, particularly the risk that the device's communication protocol circuits and/or communication protocol subsystems are damaged.

This embodiment is advantageous, because the charging speed may be improved by using the second charging mode. Thus, this method provides means for a quick charging, when feasible, and prevents at least some device's circuits and/or subsystems from being damaged, when such kind of devices are detected.

In an embodiment, the method comprises the further steps of:

When charging any wireless charging device according to the second charging mode, searching, by the wireless docking station, for a wireless communication device that supports the wireless communication interface; and if any wireless communication device has been found, changing from the second charging mode to the first charging mode.

The second charging mode may be a high-power charging mode. Hence, there may be some risk to damage communication devices and/or parts of them. The searching for a wireless communication device may include to switch off (i.e. to pause) the charging according to the second charging mode, e.g. in a cyclic way, particularly in cases when charging according to the second charging mode is done with an electric power that is so high that it "shades" the searching for a wireless communication device. For instance, NFC search would not work while high power WPC charging is active. The length of the time-intervals between the switch-off or pausing periods may depend on an estimation how long communication devices may bear the high-power emission, caused by the second charging mode, without being damaged by this.

Using this method is advantageous, because it prevents—due to its "quasi-continuous" polling—also communication devices from being damaged, that have come "later" into the reach of the charging device and, thus, have not been detected by the first searching for wireless devices. Whenever such "late" communication devices have been detected, the second charging mode is changed to the first charging mode, thus having only a low risk (or no risk) to damage the device's circuits and/or subsystems, even during charging.

In an embodiment, the method comprises the further steps of:

When charging any wireless charging device according to the first charging mode, searching, by the wireless docking station, for a wireless communication device that supports the wireless communication interface; and if no wireless communication device is found, changing from the first charging mode to the second charging mode.

This method is advantageous, because it increases the charging speed, when feasible.

In an embodiment, the wireless docking station is connected to more than one antenna that is configured to support the searching for any wireless communication device that supports the wireless communication interface.

This is advantageous, because it increases the sensitivity for communication devices that may come across. This may be particularly advantageous when performed in combination with "quasi-continuous" polling for communication devices.

In an embodiment, the first charging mode supports charging with limited power, and the second charging mode supports charging with normal power. This combines the advantages of quick charging, when feasible, with protecting sensitive communication devices.

In an embodiment, the method comprises the further steps of:

When charging any wireless charging device according to the first charging mode and/or the second charging mode, determining, by the wireless docking station, if charging of any wireless charging device is still required; and if charging of any wireless charging device is no longer required and/or no wireless charging device is found, refrain from charging.

By this method, the charging periods are reduced to periods when there is a high necessity of charging. This may be combined with a kind of "hysteresis behaviour", i.e. the WPC-devices are not loaded when their energy store below 99%, but only at lower load levels, e.g. below 95%, 90%, or 80%. In addition, a kind of (real or virtual) button may be provided, which overrules this strategy.

In an embodiment, the wireless communication interface is a Near Field Communication, NFC, interface. Devices with an NFC interface may be particularly sensitive against high-power emissions, because their devices may be designed for low-power applications.

In an embodiment, the wireless charging interface is a Qi interface and/or supports an interface according to a Wireless Power Consortium, WPC, standard.

In an embodiment, the wireless docking station is a Multi Function Smartdevice Terminal, MFST. The MFST may comprise design-elements that make it particularly advantageous for vehicles. Such design-elements may comprise some robustness against high and/or low temperatures and/or other vehicle-specifics.

A further aspect of the invention relates to a Multi Function Smartdevice Terminal, MFST, that is configured to support a method according to any one of the preceding claims.

A further aspect of the invention relates to a vehicle comprising a Multi Function Smartdevice Terminal, MFST, as described above. The vehicle may be a car, a bus, a truck, a multi-purpose vehicle, a ship or boat, an airplane or helicopter, or any kind of bike.

A further aspect of the invention relates to a program element that is configured to perform a method as described above and/or below, when executed on a computing system.

A further aspect of the invention relates to a computer-readable medium, where a program element as described above and/or below is stored on.

BRIEF DESCRIPTION OF THE DRAWINGS

An aspect of the invention is further described by embodiments shown in the figures. These embodiments are shown as examples, but are not to be considered as limitations.

The figures depict.

DETAILED DESCRIPTION OF THE PREFERRED EMBODIMENTS

Figure 1:
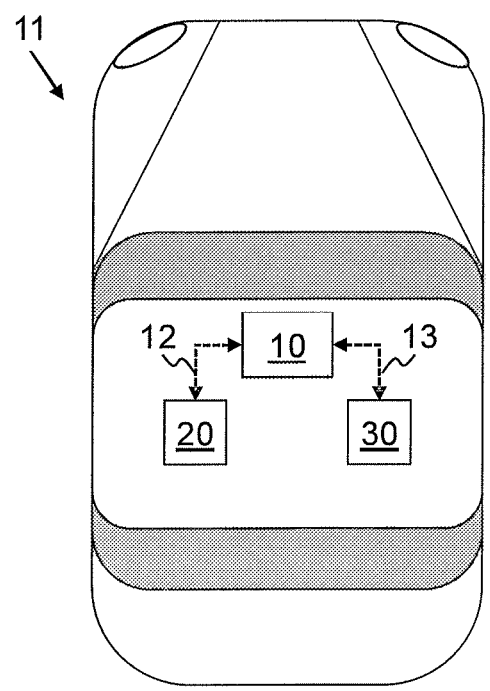
FIG. 1 depicts a schematic representation of a vehicle according to an embodiment.

A vehicle 11 as shown in FIG. 1 comprises a docking station 10, which may be arranged inside the vehicle 11, for instance close to the driver. Inside the vehicle 11 is further arranged a communication device 20 and a charging device 30. The communication device 20 and the charging device 30 may be arranged in the same device or in different devices. There may be one or several communication devices 20 and/or charging devices 30 inside the vehicle 11, particularly within reach of docking station 10. Each charging device 30 is connected to the docking station 10 by a charging interface 13. The connection to the communication device 20 and the charging device 30 is a wireless one.

Each communication device 20 is connected to the docking station 10 by a communication interface 12. The communication interface 12 may support more than one communication protocol. The communication interface 12 may support more communication protocols than the docking station 10 is able to support actively. The communication interface 12 may be configured to detect communication devices 20 only for determining their presence, in order to prevent their damaging and only optionally to communicate with them. The risk of being damaged may be caused by the charging interface 13, particularly by running the charging interface 13 in a high-power mode.

Figure 2:
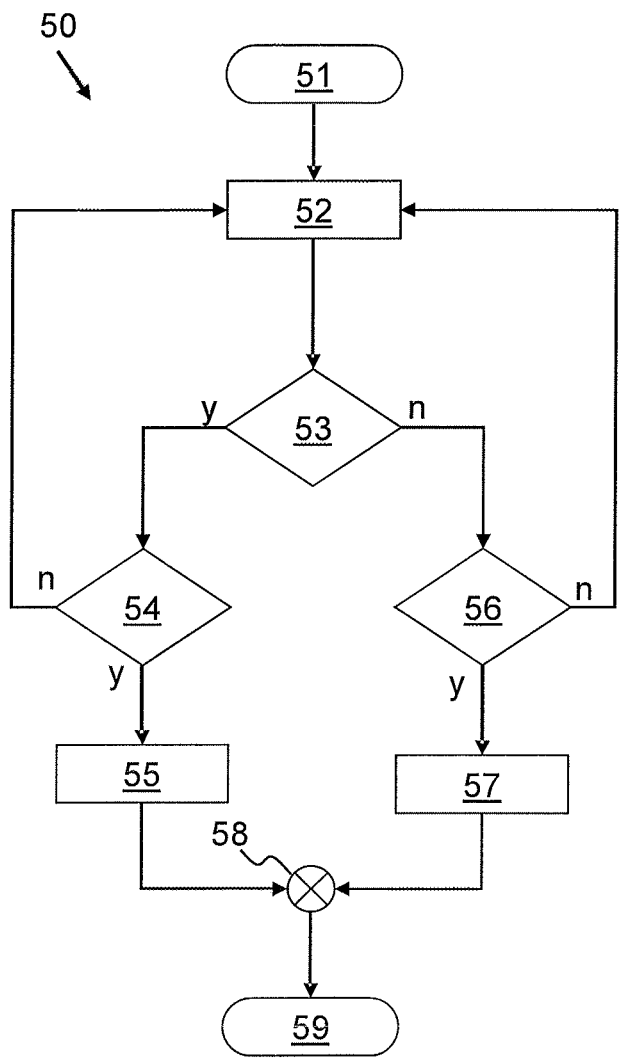
FIG. 2 depicts schematically a method according to an embodiment.

The method depicted in a flow-diagram 50 of FIG. 2 shows an embodiment to run a docking station 10, where an example is shown, for instance, in FIG. 1. The method starts in a step 51. In a step 52, the docking station 10 searches for a wireless communication device 20 that supports the wireless communication interface 12. In a step 53, there is a branch depending on the result of this searching. If any wireless communication device 20 that supports the wireless communication interface 12 has been found, the method goes to a step 54, otherwise to a step 56. In the step 54, the wireless docking station 10 searches for a wireless charging device 30 that supports the wireless charging interface 13 according to a first searching mode. The first searching mode may be a "safe" one, i.e. with reduced risk (or no risk) of damaging communication devices 20. If any wireless charging device 30 that supports the wireless charging interface 13 and any wireless communication device 20 that supports the wireless communication interface 12 has been found, the wireless charging device 30 is charged according to a first charging mode step 55. The first charging mode may be a "safe" one, i.e. with reduced risk (or no risk) of damaging communication devices 20 during charging. If no wireless charging device 30 that supports the wireless charging interface 13 has been found, the method goes to the step 52 again. After charging or—depending on the embodiment—during charging, the method goes to a joining step 58.

In the step 56, the wireless docking station 10 searches for a wireless charging device 30 that supports the wireless charging interface 13 according to a second charging mode. If such a charging device 30 has been found, the wireless docking station 10 charges the charging device 30 according to a second charging mode step 57. The second charging mode may be a "fast" one, i.e. with increased power transferred wirelessly via the charging interface 13. If no wireless charging device 30 that supports the wireless charging interface 13 has been found, the method goes to the step 52 again. After charging or—depending on the embodiment—during charging, the method goes to the joining step 58. After the joining step 58, the method goes to an end step 59. After the end step 59, the method may start again at the starting step 51. The method described here, or another method according to an embodiment, may be run "quasi-continuously". This may include a "quasi-continuous" polling for charging devices 30 and/or communication devices 20.

LIST OF REFERENCE SIGNS 10 docking station
11 vehicle
12 communication interface
13 charging interface
20 communication device
30 charging device

The invention claimed is:

1. A method for cooperative use of a wireless communication interface and a wireless charging interface, wherein the wireless charging interface supports a first searching mode and a second searching mode, the method comprising:
   Searching, by a wireless docking station, for a wireless communication device that supports the wireless communication interface;
   in response to finding any wireless communication device that supports the wireless communication interface, searching, by the wireless docking station, for a wireless charging device according to the first searching mode in which searching is performed with a limited power less than a normal power; and
   in response to finding no wireless communication device that supports the wireless communication interface, searching, by the wireless docking station, for a wireless charging device according to the second searching mode in which searching is performed with the normal power.

2. The method of claim 1, further comprising:
   If any wireless charging device that supports the wireless charging interface and any wireless communication device that supports the wireless communication interface has been found, charging, by the wireless docking station, according to a first charging mode; and
   If any wireless charging device that supports the wireless charging interface and no wireless communication device that supports the wireless communication interface has been found, charging, by the wireless docking station, according to a second charging mode.

3. The method of claim 2, further comprising:
   When charging any wireless charging device according to the second charging mode,
   searching, by the wireless docking station, for a wireless communication device that supports the wireless communication interface; and
   if any wireless communication device has been found, changing from the second charging mode to the first charging mode.

4. The method of claim 3, further comprising:
Before searching for a wireless communication device, pausing the charging of the wireless charging device according to the second charging mode.

5. The method of claim 4, wherein the wireless docking station is connected to more than one antenna that is configured to support the searching for any wireless communication device that supports the wireless communication interface.

6. The method of claim 3,
wherein the wireless docking station is connected to more than one antenna that is configured to support the searching for any wireless communication device that supports the wireless communication interface.

7. The method of claim 2, further comprising:
When charging any wireless charging device according to the first charging mode,
searching, by the wireless docking station, for a wireless communication device that supports the wireless communication interface; and
if no wireless communication device is found, changing from the first charging mode to the second charging mode.

8. The method of claim 7, wherein the wireless docking station is connected to more than one antenna that is configured to support the searching for any wireless communication device that supports the wireless communication interface.

9. The method of claim 1,
wherein the first charging mode supports charging with limited charging power less than normal charging power, and
wherein the second charging mode supports charging with the normal charging power.

10. The method of claim 1, further comprising:
When charging any wireless charging device according to the first charging mode and/or the second charging mode,
determining, by the wireless docking station, if charging of any wireless charging device is still required; and
if charging of any wireless charging device is no longer required and/or no wireless charging device is found, refrain from charging.

11. The method of claim 1,
wherein the wireless communication interface is a Near Field Communication, NFC, interface, and/or
wherein the wireless charging interface is a Qi interface and/or supports an interface according to a Wireless Power Consortium, WPC, standard.

12. The method of claim 1,
wherein the wireless docking station is a Multi Function Smartdevice Terminal, MFST.

13. The method of claim 1, wherein the wireless communication device is a difference device than the wireless charging device.

14. A Multi Function Smartdevice Terminal, MFST, that is configured to support a method according to claim 1.

15. A vehicle comprising a Multi Function Smartdevice Terminal, MFST, according to claim 14.

16. A non-transitory computer-readable medium having computer executable instructions stored thereon for execution on a processor so as to implement the method of claim 1.

* * * * *